(12) United States Patent
Gamelli

(10) Patent No.: US 10,501,237 B2
(45) Date of Patent: *Dec. 10, 2019

(54) BEVERAGE CONTAINER

(71) Applicant: Mocktail Beverages Inc., Wenham, MA (US)

(72) Inventor: William D. Gamelli, Wenham, MA (US)

(73) Assignee: Mocktail Beverages Inc., Wenham, MA (US)

(*) Notice: Subject to any disclaimer, the term of this patent is extended or adjusted under 35 U.S.C. 154(b) by 207 days.

This patent is subject to a terminal disclaimer.

(21) Appl. No.: 15/625,791

(22) Filed: Jun. 16, 2017

(65) Prior Publication Data

US 2017/0341824 A1 Nov. 30, 2017

Related U.S. Application Data

(63) Continuation of application No. 14/357,863, filed as application No. PCT/US2012/065561 on Nov. 16, (Continued)

(51) Int. Cl.
*B65D 43/02* (2006.01)
*B65D 47/12* (2006.01)
(Continued)

(52) U.S. Cl.
CPC ............ *B65D 43/02* (2013.01); *A47J 43/27* (2013.01); *B01F 13/0022* (2013.01); *B65D 47/122* (2013.01)

(58) Field of Classification Search
CPC ........ A47J 43/27; A47J 43/00; B65D 55/0809
(Continued)

(56) References Cited

U.S. PATENT DOCUMENTS

| 300,867 A | 6/1884 | Hauck |
|---|---|---|
| 324,173 A | 8/1885 | Seips |

(Continued)

FOREIGN PATENT DOCUMENTS

| EP | 0 654 417 | 5/1995 |
|---|---|---|
| WO | WO 2010/126341 A2 | 11/2010 |

(Continued)

OTHER PUBLICATIONS

Article placed in website of Arnest Co., Ltd. (Japanese PTO, Design Division Prior Art No. HJ24058089), published Jan. 7, 2013.

(Continued)

*Primary Examiner* — Jeffrey R Allen
(74) *Attorney, Agent, or Firm* — Hamilton, Brook, Smith & Reynolds, P.C.

(57) ABSTRACT

The disclosed beverage container can be a prepackaged hermetically sealed beverage container prefilled with a ready for consumption beverage for retail sale and can include three pieces, a cap, dome and vessel. The pieces can be screwable together. The dome piece can contain a strainer. The consumer can separate the dome from the vessel and add ice to the beverage to cool the beverage prior to consumption, and can strain the ice from the beverage before drinking it directly from the top opening of the dome, after it has been resealed to the vessel.

19 Claims, 5 Drawing Sheets

Related U.S. Application Data 2012, now Pat. No. 9,714,121, which is a continuation-in-part of application No. 13/341,795, filed on Dec. 30, 2011, now abandoned.

(60) Provisional application No. 61/561,498, filed on Nov. 18, 2011.

(51) Int. Cl.
*A47J 43/27* (2006.01)
*B01F 13/00* (2006.01)

(58) Field of Classification Search
USPC .................. 220/568, 254.8; 206/219, 268
See application file for complete search history.

(56) References Cited

U.S. PATENT DOCUMENTS

| | | |
|---|---|---|
| 1,042,751 A | 10/1912 | Barker |
| 1,201,284 A | 10/1916 | Gilchrist |
| 1,568,691 A | 1/1926 | Pierson |
| 1,657,927 A | 1/1928 | Heinzen |
| 1,740,223 A | 12/1929 | Burvenick |
| 1,748,483 A | 2/1930 | Hyde |
| 1,765,129 A | 6/1930 | Cooke |
| D96,965 S | 9/1935 | Fuerst |
| 2,013,615 A | 9/1935 | Fontan |
| 2,090,320 A | 8/1937 | Amick |
| 2,090,998 A | 8/1937 | Gessler |
| D116,858 S | 9/1939 | Martin |
| 2,385,648 A | 9/1945 | Prager |
| 2,433,248 A | 12/1947 | Sweier |
| 2,725,733 A | 12/1955 | Howlett Davis |
| D189,164 S | 11/1960 | Hollister |
| D199,413 S | 10/1964 | Levinson |
| D210,004 S | 1/1968 | Pettengill |
| 3,640,416 A | 2/1972 | Temple |
| 3,765,559 A | 10/1973 | Sauey et al. |
| 3,856,138 A | 12/1974 | Maekawa et al. |
| 4,203,517 A | 5/1980 | Hildebrandt et al. |
| D283,595 S | 4/1986 | Fortuna et al. |
| D283,793 S | 5/1986 | Fortuna et al. |
| 4,682,689 A | 7/1987 | Pereira et al. |
| 4,793,475 A | 12/1988 | Itzel |
| 4,872,764 A | 10/1989 | McClean |
| D304,551 S | 11/1989 | Desgrippes |
| D364,566 S | 11/1995 | Douer |
| 5,465,835 A | 11/1995 | Schumacher et al. |
| 5,547,275 A | 8/1996 | Lillelund et al. |
| 5,588,550 A | 12/1996 | Meyer |
| D384,236 S | 9/1997 | Douer |
| D390,462 S | 2/1998 | Mao |
| D424,444 S | 5/2000 | Lefebvre |
| D429,593 S | 8/2000 | Thuma |
| 6,159,513 A | 12/2000 | Judlowe et al. |
| D438,758 S | 3/2001 | Tal et al. |
| D439,111 S | 3/2001 | Tal et al. |
| D480,590 S | 10/2003 | Linz et al. |
| D480,599 S | 10/2003 | Linz et al. |
| D483,981 S | 12/2003 | Linz et al. |
| D483,982 S | 12/2003 | Irvine |
| 6,716,396 B1 | 4/2004 | Anderson et al. |
| D489,627 S | 5/2004 | Klitsner et al. |
| D493,327 S | 7/2004 | Marsden et al. |
| 6,913,165 B2 | 7/2005 | Linz et al. |
| D510,497 S | 10/2005 | Hou |
| D519,835 S | 5/2006 | Dubs et al. |
| D520,654 S | 5/2006 | Freeman et al. |
| D536,986 S | 2/2007 | Nix et al. |
| D576,495 S | 9/2008 | Slubski |
| 7,571,830 B2 | 8/2009 | Lin |
| D604,984 S | 12/2009 | Kalamaras |
| D608,141 S | 1/2010 | Sanders |
| D610,005 S | 2/2010 | McKinney |
| D619,001 S | 7/2010 | McKinney |
| D623,460 S | 9/2010 | Krasner |
| D625,541 S | 10/2010 | Kauer |
| D630,037 S | 1/2011 | Kauer |
| D631,356 S | 1/2011 | Barsoumian |
| D632,133 S | 2/2011 | Giraud et al. |
| D648,488 S | 11/2011 | Tsai |
| D654,752 S | 2/2012 | Krasner |
| 8,365,941 B2 | 2/2013 | Mayer |
| D689,336 S | 9/2013 | Slocumb et al. |
| D694,109 S | 11/2013 | Tanner |
| D697,354 S | 1/2014 | Kauer |
| D703,008 S | 4/2014 | Wampold |
| D725,953 S | 4/2015 | Gamelli et al. |
| D727,671 S | 4/2015 | Gamelli |
| D754,999 S | 5/2016 | Gamelli |
| D761,607 S | 7/2016 | Gamelli et al. |
| D761,608 S | 7/2016 | Gamelli et al. |
| D761,609 S | 7/2016 | Gamelli et al. |
| D767,930 S | 10/2016 | Gamelli et al. |
| D769,043 S | 10/2016 | Gamelli et al. |
| D778,095 S | 2/2017 | Gamelli et al. |
| 9,714,121 B2 | 7/2017 | Gamelli |
| 2003/0002385 A1 | 1/2003 | Pola et al. |
| 2003/0230575 A1 | 12/2003 | Laurent |
| 2004/0066705 A1 | 4/2004 | Linz et al. |
| 2006/0102584 A1 | 5/2006 | Wellman |
| 2010/0024660 A1 | 2/2010 | Wallace |
| 2011/0024320 A1 | 2/2011 | Roman et al. |
| 2011/0042374 A1 | 2/2011 | Chang |
| 2011/0180545 A1 | 7/2011 | Marino et al. |
| 2011/0226770 A1 | 9/2011 | Tiesberger |
| 2013/0126369 A1 | 5/2013 | Gamelli |
| 2014/0312040 A1 | 10/2014 | Gamelli |
| 2015/0050405 A1 | 2/2015 | Trager et al. |

FOREIGN PATENT DOCUMENTS

| | | |
|---|---|---|
| WO | WO 2011/089505 | 7/2011 |
| WO | 2013074950 | 5/2013 |

OTHER PUBLICATIONS http://www.bevnet.com/news/2014/mocktail-beverages-launches-line-of-non-alcholic-cocktails Posted Sep. 9, 2014.
International Preliminary Report on Patentability, International Application No. PCT/US2012/065561, dated May 30, 2014, entitled "Beverage Container".
Japanese Design Registration No. 1154509, published Sep. 30, 2002.
Komori Collections, vol. 6, p. 10, 496056 (Japanese PTO, Design Division Prior Art No. HC20019183), published Dec. 17, 2008.
Notification of Transmittal of the International Search Report and The Written Opinion for PCT/US2012/065561 dated Feb. 6, 2013.
K&D Wines and Spirits, Contreau Cocktail Recipes and Shaker, retrieved from Internet Sep. 9, 2010 www.kdwine.com/r/article/9/9-Contreau_Cocktail_Recipes_and_Shakers.

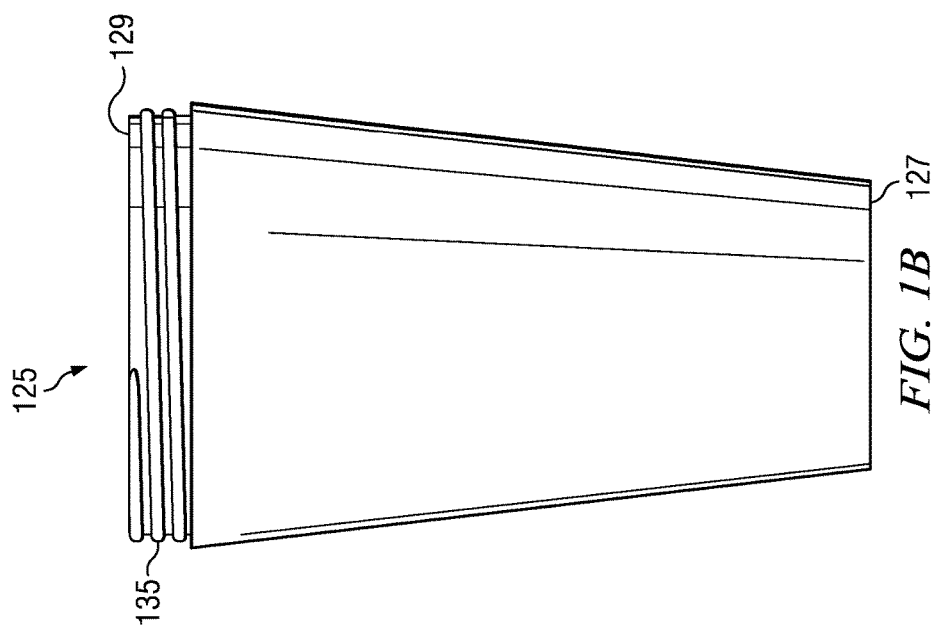
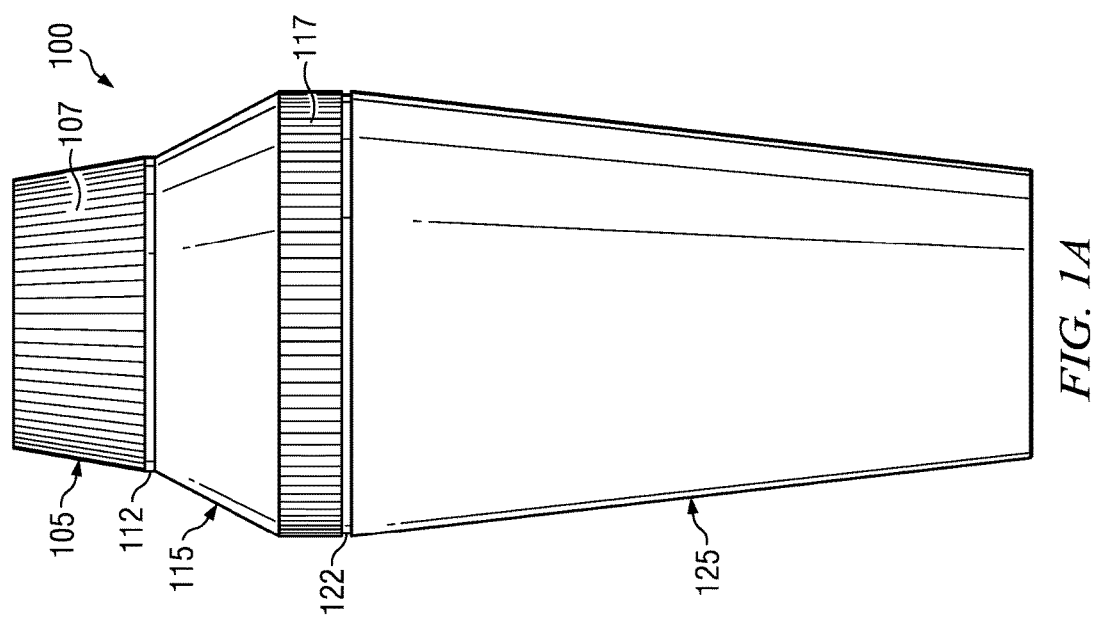
FIG. 1B
FIG. 1A

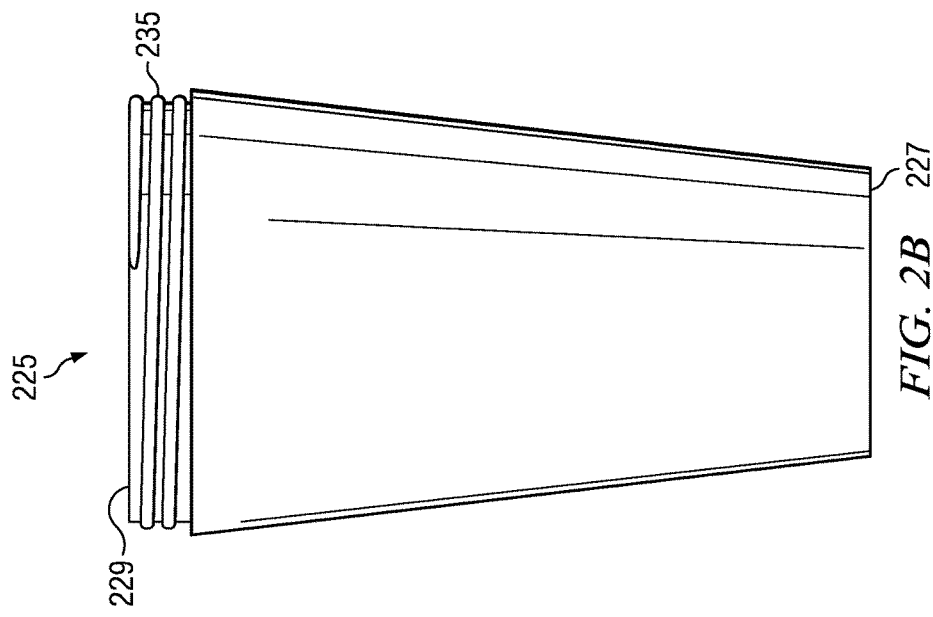
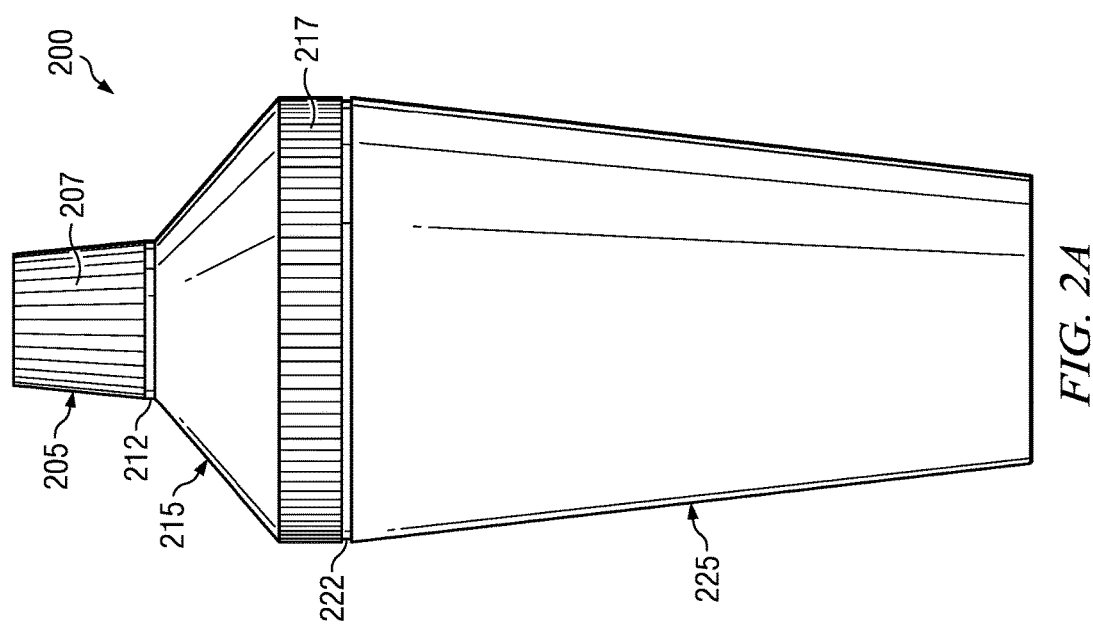
FIG. 2B
FIG. 2A

BEVERAGE CONTAINER

RELATED APPLICATIONS

This application is a continuation of U.S. application Ser. No. 14/357,863, which is the U.S. National Stage of International Application No. PCT/US2012/065561, filed Nov. 16, 2012, which designates the U.S., published in English, which is a continuation-in-part of U.S. application Ser. No. 13/341,795, filed on Dec. 30, 2011, which claims the benefit of U.S. Provisional Application No. 61/561,498, filed on Nov. 18, 2011. The entire teachings of the above applications are incorporated herein by reference.

BACKGROUND

There are currently many devices and methods used for preparing and packaging soft-drink beverages for distribution, sale, and consumption. Two of the most common devices include the "pop-top" can and the plastic or glass bottle with a removable, resealable twist-off cap. The pop-top can is designed for immediate consumption, or transfer to another vessel, as the standard pop-top cannot be resealed. Beverages contained within plastic or glass bottles with a removable, resealable twist-off cap can be consumed over longer periods of time, because the twist-off cap can be resealed to slow the contents from spoilage due to external atmospheric exposure and/or other causes.

Presently, the soft-drink beverage containers that are distributed for sale and consumption are available in a number of different volumes. Typically, in the United States, pop-top cans are sold in 12 fluid ounce volumes. In other parts of the world, pop-top cans are usually sold in 355 milliliter volumes, which is roughly the metric equivalent of the volume of the U.S. pop-top can. New sizes and shapes of the pop-top can have recently come to market. Plastic bottles with a removable resealable twist-off cap are generally offered in a wide variety of sizes, which include 20 fluid ounces, one-liter, and two-liter volumes. This is due, at least in part, to the resealable nature of the twist-off cap. Glass bottles come in a variety of sizes from single serve juice bottles to family size, both with resealable caps.

Consumers prefer many soft-drinks to be cooled prior to consuming them. In fact, many consumers will not drink some soft-drinks unless they are cooled because they do not like the taste of the warm beverage. Generally, in order to cool a soft-drink, as sold in one of the currently available beverage containers on the market, it must be placed into a cool or cold environment, such as a refrigerator or freezer, packed in ice, or a combination of ice and water, for a period of time, or the soft drink must be poured into a second container and mixed with ice or some other cooling agent.

SUMMARY

A mixed drink is a beverage in which two or more ingredients are mixed, and often includes alcohol. It is typical to cool a mixed drink by pouring and serving it over ice. However, in some cases the use of a shaker is preferred, which allows the beverage to mix with ice, cooling it, before it is strained into a glass to be served. Although the container described here might be used in a similar fashion, it is primarily intended to be used in the bottling of pre-mixed soft-drinks for sale. The soft-drink need not be mixed with alcohol.

A beverage container, either a soft-drink or mixed drink beverage container, and corresponding method of preparing, bottling, packaging for distribution, sale, and consumption, according to an example embodiment of the present invention, includes a cap, dome, and vessel. The beverage container is configured in an arrangement in which each piece is removable and resealable. The vessel, which in an example embodiment can contain a premixed soft-drink beverage ready for consumption, can be screwed to the dome, creating a resealable closure. Along the top of the vessel, at the open end, there can be threading. The dome has a top opening and a bottom opening. The bottom opening of the dome can be configured with threads to enable the screwing of the dome to the vessel. The dome can also contain a fixed strainer, through which strained liquid, such as a premixed soft-drink beverage, can pass, situated near the upper inside portion of the dome. Along the top opening of the dome, a lip wall (neck), having a generally cylindrical shape, can rise up out of the dome. A cap can be screwed onto the top of the dome to create a resealable closure. The exterior of the lip wall (neck) can be configured with threads for screwing the cap and dome together, the direction of which may or may not be the reverse of that for screwing the dome and vessel together. With reverse threads, loosening the cap does not apply force to loosen the dome. Alternatively, a locking mechanism, such as a raised nub on the exterior wall near the threading of the vessel, can be used to help prevent loosening of the dome and potential spills by necessitating that extra pressure be applied to loosen the screwed junction of the dome and vessel.

According to another example embodiment, the cap can have a ridged or other slip-proof grip to facilitate fastening and unfastening to the dome. The dome can also be configured with a ridged or other slip-proof grip to facilitate fastening and unfastening to the cap and/or the vessel.

The soft-drink beverage container can be made out of recyclable materials such as aluminum, plastic, glass, and/or stainless steel, or a combination thereof.

According to a further example embodiment of the present invention, the cap, when arranged securely to the dome, can be configured with an anti-tamper safety seal which indicates if the packaging has been tampered with post production. Similarly, the sealed dome and vessel junction can be fixed with an anti-tamper indicating safety seal.

According to a further example embodiment, an anti-tamper indicating safety seal, or shrink wrap, can be located substantially along the entire length (or less) of the outside of the container, having perforations located near the junction of the cap and dome and near the junction of the dome and vessel to facilitate removal of the seal by the consumer.

According to a yet further example embodiment of the present invention, the volumetric capacity of the vessel can exceed the volume of the packaged pre-mixed beverage by 10 to 25 percent.

The soft-drink beverage container, in a yet further example embodiment, can be made using double-walled construction for insulating the contents from the outside environment.

According to an example embodiment of the current disclosure, in a method of preparing and bottling a beverage, a pre-mixed beverage can be deposited into the vessel prior to screwing the cap onto the sealed dome and the dome on the vessel. According to an alternative example embodied method, a pre-mixed beverage can be deposited into the vessel prior to screwing the dome onto the vessel. The convenience to the consumer coupled with the design elements allowing for bottling at a filling plant are unique.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1A is a profile view of an example embodiment of the beverage container including the cap, dome, and vessel arranged in a sealed configuration with conventional threading.

FIG. 1B is a profile view of the vessel of FIG. 1A.

FIG. 2A is a profile view of an example embodiment of the beverage container including the cap, dome, and vessel arranged in a sealed configuration with a smaller diameter cap and reverse threading at the vessel.

FIG. 2B is a profile view of the vessel of FIG. 2A.

DETAILED DESCRIPTION

Figure 3A:
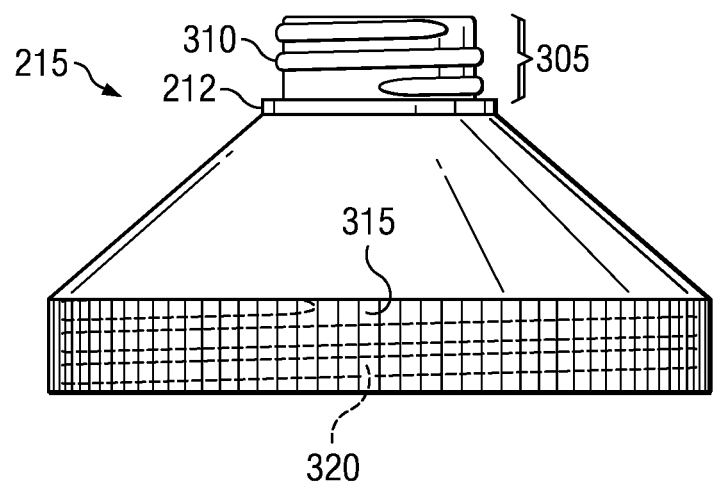
FIG. 3A is a profile view of the dome of FIG. 2A.

A description of example embodiments of the invention follows.

The current disclosure pertains in general to containers for liquid and, more particularly, to containers for non-carbonated, soft-drink beverages to be consumed.

The vast majority of currently available soft-drink beverage containers are treated as a single-use device by consumers, and discarded after the contents have been emptied. Further, most soft-drink beverages sold today are made out of recyclable materials, which are typically aluminum, plastic, or glass. In general, the volume of the soft-drink that is distributed within the beverage container matches the maximum practical volumetric capacity of that container. In a case where a consumer wants to cool a soft-drink prior to drinking it, often it is poured into a second container to be mixed with ice or some other cooling agent. If a consumer wants to drink a cooled beverage, but does not want to drink the beverage with ice in it, in order to achieve such a result traditionally, one would typically use a strainer and multiple containers. One form of strainer is in a capped dome of a shaker assembly. The problem with using several instruments to perform the task of cooling the beverage with ice, and then straining the beverage prior to consumption, is that this typically causes a mess, soiling the several containers and instruments with the residue of the drink, and there is a high chance of some spillage. Further, the strainer is typically not handy when away from home or a bar.

The container disclosed here enables an opportunity to pre-fill the container with a variety of non-carbonated beverages on standardized or customized beverage filling machinery, to market those beverages to drinkers and non-drinkers alike, and provides the added convenience and utility to the consumer of cooling a pre-mixed soft-drink at the point of sale or at any future point in time.

There is a large group of people that cannot or choose not to drink alcohol. Often, members of this group feel separated when they are in the presence of others that are drinking alcohol. Individuals that cannot or choose not to drink alcohol may find an example embodiment of the present invention is particularly useful at a social gathering in which the individual wishes to enjoy drinking a cocktail, but without alcohol. Alternative healthy life-styles are becoming increasingly popular. For a variety of reasons, including healthy lifestyle choice, pregnant or nursing mothers, medication conflicts, religious believes, or treatment such as Alcoholics Anonymous, a consumer may choose not to drink alcoholic beverages at all, or in certain limited cases, such as being a designated driver. While such a choice is becoming more socially acceptable, the consumer may not want to draw attention to his or her decision at a social gathering.

An example embodiment of the present disclosure can help conceal the consumer's decision not to imbibe alcohol by enabling cooling a soft-drink and serving it in a traditional bar glass to allow a non-drinker to fit into traditional social settings where alcohol is served. An example embodiment of the present disclosure, by providing a unique beverage container, enables a ritualistic cooling process for its contents, which is similar to the process long associated with classic cocktail culture. The soft-drink beverage container enables the consumer to enjoy, fit in and find comfort in, the ritualistic traditions and camaraderie associated with drinking alcohol, but without drinking any intoxicating substance, and avoiding the potentially awkward social ramifications.

According to an example embodiment of the present invention, a reusable, recyclable soft-drink bottle can be comprised of three pieces in the basic shape of a martini shaker: a vessel to hold a premixed beverage; a resealable dome which may be unscrewed from the vessel; and, a resealable cap which may be unscrewed from the dome. The soft-drink shaker bottle design allows the consumer to drink a premixed beverage straight from the bottle, as he or she does today from conventional bottles or cans. However, an example embodiment of the present invention also gives the consumer the option to remove the dome and add ice, perhaps immediately at the store where the soft-drink is purchased, and then replace and reseal the dome onto the vessel holding the pre-mixed beverage and ice. The consumer will, with or without ice, open the resealable screw cap to drink the beverage. The dome is resealable to allow the ice to be added and then replaced prior to drinking directly from the bottle or pouring the contents into a glass or cup. The cap is resealable to allow for hand-held use on the go, or in an automobile cup holder, and for consumption after refrigeration when contents remain.

An example embodiment of the soft-drink shaker bottle has three pieces with two resealable screw on/off features attaching each part to the other. The dome can unscrew from the vessel in a clockwise or counter-clockwise motion. The cap can unscrew from the dome in a similar or reverse clockwise or counter-clockwise motion. This double screw mechanism allows the consumer to unscrew the dome from the vessel, for the purpose of adding ice, and for unscrewing the cap from the dome for the purpose of consuming the beverage directly, or pouring the beverage. The feature of both sets of threads screwing in the same direction best enables the beverage bottler to run the container on standard beverage filling machinery. The two resealable screw features can include tamper-indicating features and a locking mechanism to prevent accidental spills.

The threads may be in reverse-direction relative to one another. For example, the dome can unscrew from the vessel in a clockwise or counter-clockwise motion, while the cap can unscrew from the dome in a reverse counter-clockwise or clockwise motion. It should be clear to those skilled in the art that, for this example embodiment, the direction of the particular threading is not of importance, only that the two threading may be in opposite directions relative to one another. This double reverse screw mechanism allows the consumer to loosen only the cap, while tightening the dome on the vessel, and thus ensuring that the dome does not inadvertently loosen. This feature is useful to prevent accidental spilling of the beverage.

Embodiments of the beverage container can be made from any material, or combination of materials, suitable for distribution and retail sale, and may include, for example, aluminum, plastic, glass, and/or stainless steel. It should be understood by those of skill in the art that various elements of the beverage container, including the cap, dome, and vessel, may each be individually composed out of the same material or different materials. For example, the cap may be plastic, while the dome is aluminum, and the vessel is glass, or the cap may be plastic, while the dome is stainless steel, and the vessel is stainless steel, or any such similar combination. In one embodiment, the vessel is glass and the dome and cap are plastic.

The choice of beverage container material can be influenced by many factors, including, but not limited to, the following examples: ingredients of the beverage and whether or not they include alcohol; whether a hot fill or cold fill process is optimal; sensitivity of each individual type of beverage to light and oxygen; potential shelf life issues related to fresh ingredients, preservatives, or additives; volume of fluid contained; cost of raw materials; cost of manufacturing the bottle in each material, or a combination of materials; availability of co-packing facilities; filling line machinery availability, and its requirements regarding lip wall or neck sizes and depths as well as overall beverage container height, width, and pressure handling requirements; distance and cost of transporting bottles made of differing materials to a co-packing facility; possible breakage or denting factors; recycling rates and ever more eco-friendly materials that consumers demand. As technology, filling machinery, beverage development, ingredients, materials, industry trends, and consumer tastes change, the dimensions of the beverage container, and the material chosen to produce it may change to accommodate these market pressures and seize new opportunities.

An example embodiment of the vessel can be designed to hold, for example, an 18 to 20 ounce volume, but sold containing a lesser amount of a pre-mixed beverage, for example, 16 ounces, to enable the consumer to add ice without spillage. The vessel can have threading on an outside top ridge for attaching the dome. The dome has inside threads for attaching to the vessel.

According to an example embodiment, a lip wall (or neck), is designed to be a proper receptacle transition for bottling the beverage in the container using standard beverage bottling machinery. The dimensions of the lip wall, or neck, may be influenced by multiple factors including the volume of the beverage container and the materials used for its construction, such as aluminum, plastic, glass, stainless steel, or any other suitable material, or some combination thereof. The neck may come in different widths and depths depending material choice and size of container. In a preferred example embodiment, a lip wall (or neck), preferably between about one half inch to one inch in height, and designed to allow the consumer to drink straight from the bottle without the need for a straw or glass/cup, rises above the strainer. The lip wall or neck is preferably in the range in diameter from a half inch to three inches, with a range of one to two inches being most preferred. It should be understood by those of skill in the art that the dimensions of the lip wall or neck, and, more generally, those of the container, can vary depending on several factors, including the materials used, the beverage filling machinery used, and overall volumetric capacity of container.

The lip wall serves to gather the beverage as it flows through the strainer, with or without ice. As the consumer tips the bottle toward the mouth, the beverage gathers and he or she may drink from the container in the same manner as from any traditional soft-drink bottle or can. If no lip wall is present above the strainer line, and the strainer is exposed, it becomes exceedingly difficult to drink straight from the bottle without the consumer spilling the beverage on his or her face and/or clothes. Without the lip wall, a consumer would be required to use a straw to sip the contents to remain spill-proof, or, alternatively, the consumer would be required to pour the contents into a glass/cup. An example embodiment of the disclosed beverage container does not require a straw, and is simple to drink straight from the bottle, with or without ice. It is also useful as a container to drink directly from because it is more spill-proof than conventional soft-drink bottles, as the strainer adds a measure of spill-proofing above and beyond that of conventional soft-drink bottles. The outside of the lip wall has threads for securely screwing the resealable cap into place. The cap has inside threads for securely attaching it to the dome's lip wall (neck).

Once filled with a ready for consumption beverage inside, the junctions of the cap and dome can be sealed for distribution and retail sale. Sealing for retail sale must include a fluid-tight seal and preferably also includes a mechanism to indicate tampering. Such functions may be linked and performed by a single mechanism, as is the done with a pop-top, or may be distinct and performed by separate mechanisms. For example, safety sealing for retail sale may include utilizing heat-applied foil seals applied across container openings (e.g., across the mouth of the vessel and/or across the lip wall (neck) of the dome) for securing against leakage and utilizing tamper-evident seals such as frangible shrink-wrapped film seal(s), ribbed container elements (e.g., the cap and/or dome) with tamper evident rings, or flat-topped vacuum sealed metal closures that become convex upon release of the vacuum.

The dome, cap, vessel, or any combination thereof, can have slip-proof grips to enable the consumer to grip each piece securely while unscrewing or re-screwing the bottle pieces back together. For example, the slip-proof grip can be comprised of a ridged or grooved surface of the container, and/or an additional material having suitable physical characteristics, which may include a higher elasticity and/or higher coefficient of friction than the respective characteristic of the container material.

It can become a challenge to use a conventional shaker because the parts become stuck together. Whether it is because of temperature and/or pressure reasons, or sticky residue from the beverage contents, the pieces become stuck together and the user's hands often slip while trying to loosen the assembly. In some cases, the user must strike the assembly, with the contents inside, against a hard surface, hoping to jar the parts loose. In other cases, the user must run the stuck parts under hot water, or through a dishwasher, in the hopes that the hot water will dissolve the sticky contents, and the pieces become free of each other. The double tamper-indicating screw threading, in combination with slip-proof groves for gripping, make the disclosed example embodiment more secure for the consumer drinking the premixed contents, and more convenient for opening and closing, and for re-use of the container.

The soft-drink shaker bottle allows the consumer to drink straight from the bottle, with or without ice, as previously described, as a single serving size container. The consumer also has the option to pour the contents into a cocktail or martini glass, or any other container, when the contents are ideal for such an application, such as a non-alcoholic cocktail. An advantage of an example embodiment of the soft-drink bottle is that it can be used as a single serving size container, or it can provide two or more smaller serving sizes, depending on the consumer's use. When the consumer uses the pre-mixed contents as a non-alcoholic cocktail, they will likely unscrew the dome and add ice. The consumer will then screw the dome back into place, shake the contents, and unscrew the cap, allowing the contents to be poured into traditional bar glasses to share with friends. In this situation, the single serving size bottle offers two or more smaller servings. In other words, if the cooled pre-mixed beverage contents of the single serving size bottle, which may contain, for example 16 to 18 ounces, are served in a bar glass, for example a martini glass, which typical holds only four to six ounces (4-6 oz.), then three or more four to six ounce servings can be offered. (A total of three six ounce (6 oz.) martini-sized smaller servings can be provided from the example 18 oz. contents, or four four ounce (4 oz.) smaller servings can be provided from the example 16 oz. contents when chilled with ice.) It should be recognized by those of skill in the art that example embodiments can also be made into larger or smaller sizes, such as a larger half gallon size, for party applications or a smaller scaled down 12 ounce size for individual consumption, typically served to a consumer in a bar or restaurant. The larger sized example embodiments can also include a tamper-proof resealable dome and cap that can screw off the larger vessel for multiple pours.

In a preferred embodiment of the container, the practical volumetric capacity of the vessel exceeds the soft-drink beverage sold within it by a range of 10 to 25 percent. The excess practical volumetric capacity of the vessel allows ice, or some other ingredient, to be added to the pre-mixed beverage without causing the contents to overflow and spill.

The single/multiple serving size example embodiment can be sold individually as well as packaged into multi-packs of different flavors, for a multi-flavored party-pack concept. While the larger size example embodiment is more useful for a party setting in which a single flavor is preferred.

An example alternative embodiment of the beverage container can be made with a double-walled construction for insulation, similar to the construction of a travel mug for hot beverages. The beverage container can hold ice, and if it does, it may tend to sweat in warmer environments. Double-walled construction is useful in that it will prevent condensation from accumulating on the outside of the container, preventing such sweating, which causes inconvenience to the consumer. Such upscale construction can be a true multi-use to go bottle for all the user's cold or iced drinks.

In a method of preparing a soft-drink beverage and a corresponding container packaging for distribution, sale, and consumption, which includes a cap, dome, and vessel, a pre-mixed beverage can be deposited into the vessel prior to screwing the cap onto the previously screwed together and sealed dome and vessel. According to an alternative method, a pre-mixed beverage can be deposited into the vessel prior to screwing the dome onto the vessel, with or without the cap previously screwed and sealed to the dome. Further, it should be understood by those of skill in the art that the soft-drink beverage ingredients can be deposited into the vessel as a pre-mixed beverage, or the ingredients of the beverage deposited individually into the vessel prior to mixing, or some combination thereof.

FIG. 1A is a profile view of an embodiment of the present invention. The beverage container 100 can be made up of three parts, a cap 105, a dome 115 and a vessel 125. The beverage container is in the basic shape of a cocktail shaker. Vessel 125 is used to hold the pre-mixed beverage. The dome 115 is screwed onto the vessel 125. The cap 105 is screwed onto the top of the dome 115. After removing the cap 105 a consumer can drink the beverage directly from the container 100 in a manner similar to traditional beverage containers such as standard soda bottles.

The consumer, after purchasing the beverage in the container 100, can remove the dome 115, unscrewing it from the vessel 125, to place ice within the vessel 125 to cool the beverage contained within. The consumer can then reattach the dome 115, resealing it to the vessel 125, then shake to cool and strain the cooled beverage contents of the vessel 125 through the dome 115 out of its top after removing the cap 105. When the beverage container 100 is distributed it can contain a tamper-indicating safety seal 112 between the dome 115 and the cap 105 indicating whether post-production tampering has occurred, compromising the seal between the cap 105 and the dome 115. The beverage container 100 can contain an additional tamper-indicating safety seal 122 between the dome 115 and the vessel 125. Similarly, safety seal 122 would indicate whether tampering has occurred post-production between the dome 115 and the vessel 125 of the beverage container 100. The safety seals 112 and 122 help to maintain the integrity of the mixed beverage being distributed from the producer.

Those of skill in the art will realize that the tamper-indicated functionality of safety seals 112 and 122 can be alternatively accomplished by using a unitary mechanism, such as a shrink-wrap film (or shrink sleeve), extending over substantially the entire length of the container or less, with perforations located at the approximate locations indicated by seals 112 and 122. Such seal types can be easily torn-away by consumers.

Those of skill in the art will further recognize that the leakage prevention functionality required for retail sale may be accomplished by using hermetic seals, such as a heat-applied foil seal across the opening, to seal the interior chambers of the container. Hermetic seals can be located approximately at seal 112 and most preferably at seal 122. Such seals may be in addition to, or in lieu of, other seals, and will help ensure the freshness of the contents of the container by further reducing the exposure to the outside environment.

In an embodiment of the container having a glass vessel 125, a ring-shaped foam seal, located approximately just above the threading 135 can be used. Such a foam seal in combination with a glass vessel can be used by the consumer to tightly reseal the vessel 125 to the dome 115 and prevent accidental leakage.

In an embodiment of the container having a plastic vessel 125 made from a plastisol-type material, a foil hermetic seal can be applied across the top of the vessel after it has been filled with its contents using a heating process to melt the foil to the vessel 125.

In an example embodiment of the disclosed beverage container 100, the pieces can be screwed together using the same direction of rotation for both sets of pieces. For example, cap 105 will screw onto the dome 115 with clockwise rotation using clockwise screw threads. The dome 115 will screw onto the vessel 125 also with clockwise rotation using clockwise screw threads. It should be clear to those skilled in the art that the direction of the particular threading is not of importance, only that the two threading be in the same direction relative to one another. The threaded features 135 (310 and 320 of FIG. 3A, 405 of FIG. 4B) of the vessel 125, dome 115, and cap 105 can further contain a locking feature that helps prevent accidental spills by ensuring that when the consumer is unscrewing one portion of the beverage container, that the portion intended to remain closed is not also be loosened. As is known to those of skill in the art, the locking feature can be a small raised portion, such as a small nub or bump, in the collar, that will require additional pressure to be applied for release. The direction of the threading can be determined by manufacturing standards. To facilitate the unscrewing of the cap 105 from the dome 115, the cap 105 can have a ridged slip-proof cap grip 107. Similarly, to facilitate the unscrewing of the dome 115 from the vessel 125, the dome 115 can have a ridged slip-proof dome grip 117.

FIG. 1B is a profile view of the vessel 125. The vessel 125 is generally cylindrical in shape, and has a closed end 127 and an open end 129. In fact, the vessel is frustoconical in shape, but considered to be generally cylindrical. Clockwise threads 135 are located along the top exterior wall of the vessel 125, enabling a tight spill-proof seal with the dome 115 (as illustrated in FIG. 1). The vessel 125 is designed to be partially filled with a pre-mixed beverage, enabling the consumer to later add ice or other second ingredient to the vessel prior to consumption. The vessel 125 can be made out of recyclable material, such as aluminum, plastic, or glass, non-recyclable material, such as stainless steel, or any material, now known or later developed, suitable for beverage distribution and retail sale. The vessel 125 can also insulate the contents by using a double-wall construction, similar to that of a thermos or travel mug, to maintain the temperature of the beverage within the container.

FIG. 2A is a profile view of an alternate embodiment of the beverage container 200, and can be made up of three parts, a cap 205, a dome 215 and a vessel 225. The dimensions of the cap 205 are dependent upon the dimension of the lip wall 305 (shown in FIG. 3A) and may be determined by such factors as the volume of the beverage container and/or the materials used for its construction.

The beverage container is in the basic shape of a cocktail shaker. Vessel 225 is used to hold the pre-mixed beverage. The dome 215 is screwed onto the vessel 225. The cap 205 is screwed onto the top of the dome 215. After removing the cap 205 a consumer can drink the beverage directly from the container 200 in a manner similar to traditional beverage containers such as standard soda bottles.

The consumer, after purchasing the beverage in the container 200, can remove the dome 215, unscrewing it from the vessel 225, to place ice within the vessel 225 to cool the beverage contained within. The consumer can then reattach the dome 215, resealing it to the vessel 225, then shake to cool and strain the cooled beverage contents of the vessel 225 through the dome 215 out of its top after removing the cap 205. When the beverage container 200 is distributed it can contain a tamper-indicating safety seal 212 between the dome 215 and the cap 205 indicating whether post-production tampering has occurred, compromising the seal between the cap 205 and the dome 215. The beverage container 200 can contain an additional tamper-indicating safety seal 222 between the dome 215 and the vessel 225. Similarly, seal 222 would indicate whether tampering has occurred post-production between the dome 215 and the vessel 225 of the beverage container 200. The tamper-indicating safety seals 212 and 222 help to maintain the integrity of the mixed beverage being distributed from the producer.

Those of skill in the art will recognize that alternative seals such as those described above in reference to seals 112 and 122 of FIG. 1 can be similarly applied with respect to seals 212 and 222 of FIG. 2.

In the example embodiment of the beverage container 200 in FIG. 2A, the direction of the threading the cap 205 can screw onto the dome 215 with a clockwise rotation using clockwise threads. The dome 215 can screw onto the vessel 225 with counter-clockwise rotation using counter-clockwise screw threads. It should be clear to those skilled in the art that the direction of the particular threading is not of importance, only that the two threadings may be in the opposite directions relative to one another. The reverse thread feature and/or locking feature helps prevent accidental spills by ensuring that when the consumer is unscrewing one portion of the beverage container, that the unintended portion is not also loosened. To facilitate the unscrewing of the cap 205 from the dome 215, the cap 205 can have a ridged slip-proof cap grip 207. Similarly, to facilitate the unscrewing of the dome 215 from the vessel 225, the dome 215 can have a ridged slip-proof dome grip 217.

FIG. 2B is a profile view of an alternative embodiment of the vessel 225. The vessel 225 is generally cylindrical in shape, and has a closed end 227 and an open end 229. In fact, the vessel is frustoconical in shape, but considered to be generally cylindrical. Here, counter-clockwise threads 229 are located along the top exterior wall of the vessel 225, which enable the vessel to screw to the dome 215 using a direction of rotation that is the reverse of that used to screw the cap 205 to the dome 215 (as illustrated in FIG. 2A). The vessel 225 is designed to be partially filled with a pre-mixed beverage, enabling the consumer to later add ice or other second ingredient to the vessel prior to consumption. The vessel 225 can be made out of recyclable material, such as aluminum, plastic, or glass, non-recyclable material, such as stainless steel, or any material suitable for beverage distribution and retail sale now known or later developed. The vessel 225 can also insulate the contents by using a double-wall construction, similar to that of a thermos or travel mug, to maintain the temperature of the beverage within the container.

FIG. 3A is a profile view of the dome 215. The bottom of the dome 215 is designed to fit over the open end 229 (shown in FIG. 2B) of the vessel 225. The inside lip or wall of the bottom of the dome 215 has counter-clockwise threads 320 that are complimentary to the vessel threads 235 (shown in FIG. 2B) to enable the dome 215 and vessel 225 to be sealed and resealed. At the top portion of the dome 215 is the lip wall 305. The exterior of the lip wall contains clockwise threads 310 to enable to the cap 205 be screwed onto the dome 215. The lip wall 305 rises above the fixed strainer 325 (shown in FIG. 3B). The lip wall 305 enables the consumer to drink directly from the beverage container 200 without spilling. At the bottom of the dome 215 on the outside wall is the ridged slip-proof dome grip 315, allowing for the user to get a more secure grip to seal and unseal the dome 215 from the vessel 225.

Figure 3B:
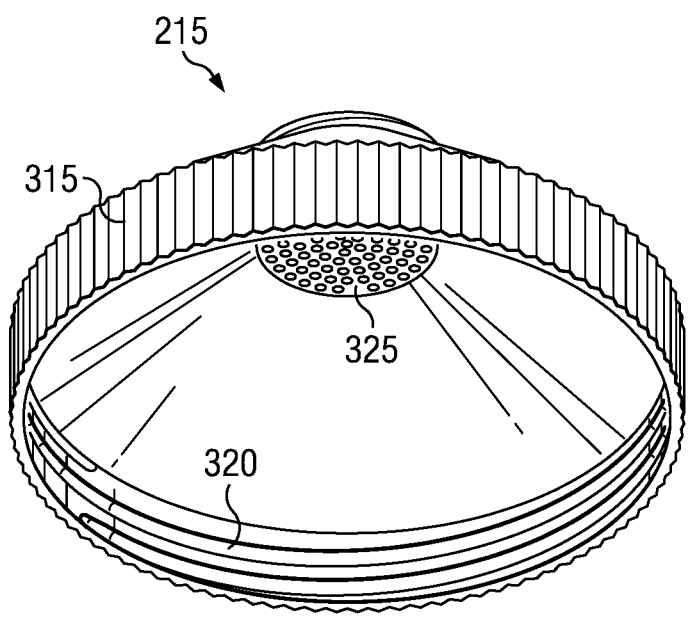
FIG. 3B is a perspective view of the dome looking upwards from below.

FIG. 3B is a perspective view of the dome 215 looking up inside of it from below, illustrating another view of the ridged slip-proof dome grip 315, and the inside threads 320 to enable the attachment of the vessel 225 (shown in FIG. 2A) and the dome 215. Also visible in this view is the fixed strainer 325, located in the upper portion of the dome 215 close to the dome ceiling. The lip wall 305 extends up above the fixed strainer 325.

Figure 3C:
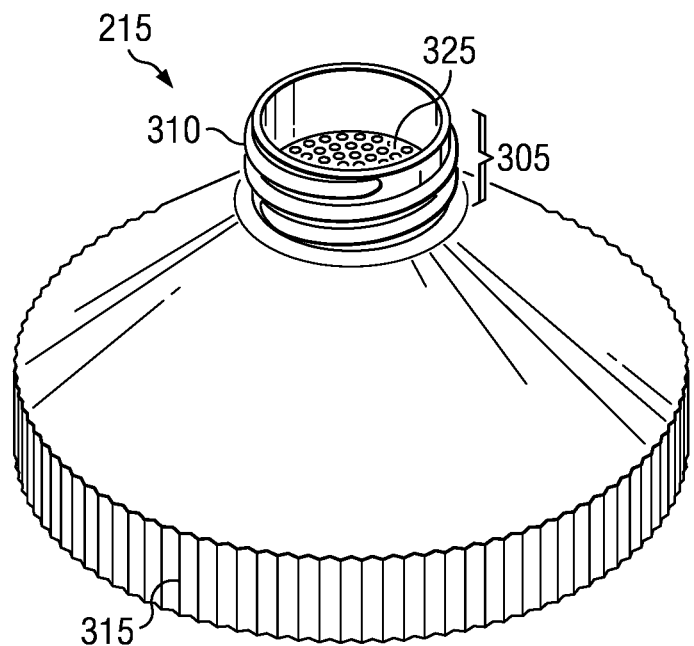
FIG. 3C is a perspective view of the dome looking downward from above.

FIG. 3C is another perspective view of the dome 215 looking downward from above, illustrating the lip wall 305 rising above the fixed strainer 325. The lip wall allows for the beverage to collect after being strained, but prior to being directly consumed from the beverage container 200. The lip wall 305 also allows the beverage to collect at it prior to being poured from the beverage contain 200 by the consumer.

Figure 3D:
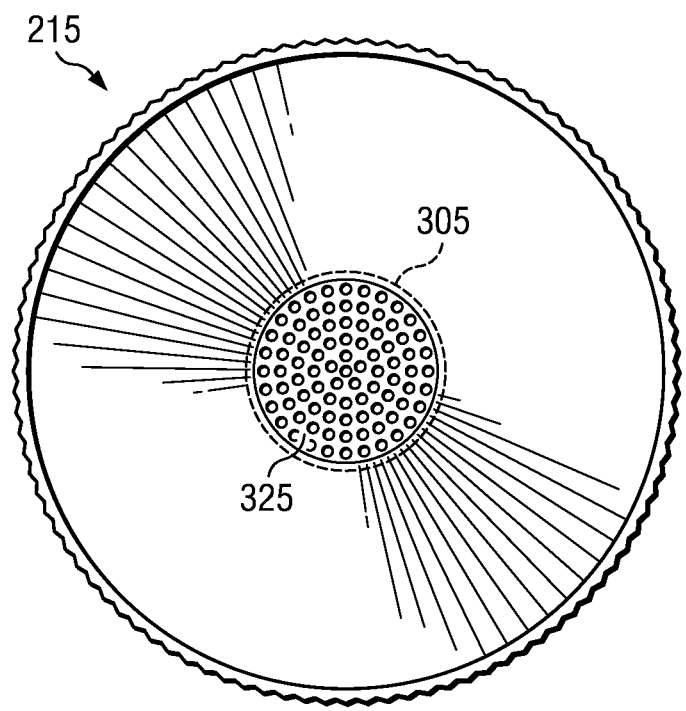
FIG. 3D is a top-side view of the dome.

FIG. 3D is a view of the dome 215 from directly above it. The fixed strainer 325 sits below the lip wall 305 in the diametrical center of the dome 215. The lip wall 305 rises above the strainer 325.

Figure 4A:
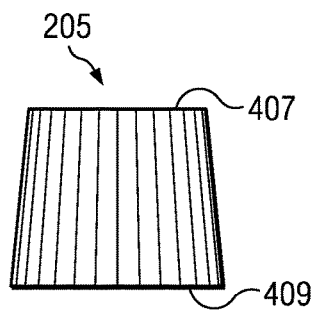
FIG. 4A is a profile view of the cap of FIG. 2A.

FIG. 4A is a profile view of the cap 205. The cap 205 contains a ridge slip-proof grip 207 (shown in FIG. 1 and FIG. 4B) and clockwise threads to fit over the dome lip wall 305 (shown in FIG. 3A). In a disclosed example embodiment, the cap 205 can be frustoconical, tapering from a wider opened end 409 that includes the clockwise threads 405 to fit over the dome wall 305 towards the more narrow top (closed end) 407. The bottom open end 409 of the cap 205 is designed to fit over the lip wall 305. The inside wall of the cap 205 has clockwise threads 405 (shown in FIG. 4B) that are complimentary to the lip wall threads 310 (shown in FIG. 3A) to enable the cap 205 and dome 215 to be sealed and resealed. Along the outside wall of the cap 205 is a ridged slip-proof cap grip 207, allowing the user to get a more secure grip to seal and unseal the cap 205 from the dome 215.

Figure 4B:
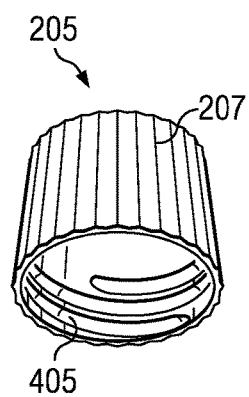
FIG. 4B is a perspective view of the cap looking upwards from below.

FIG. 4B is a perspective view of the cap 105 looking upward from below, illustrating the ridged slip-proof cap grip 207, and the inside threads 405, which enable the attachment of the cap 205 and the dome 215.

Figure 4C:
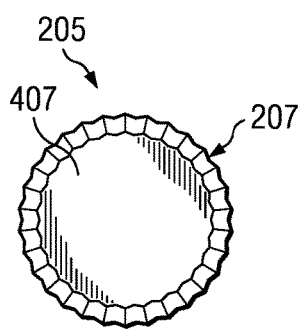
FIG. 4C is a top-side view of the cap.

FIG. 4C is a view of the cap 205 from directly above it. The closed end 407 of the cap is visible. The ridged slip-proof cap grip 207 is also visible.

Figure 5:
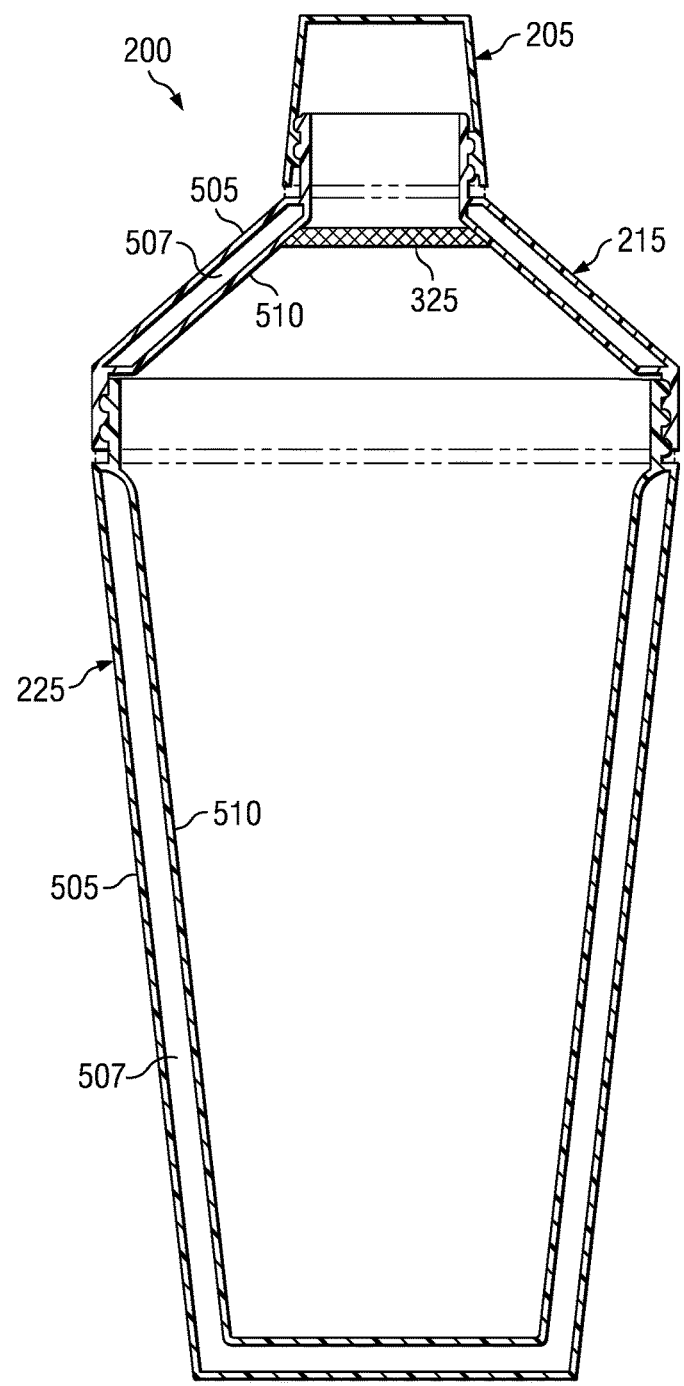
FIG. 5 is a cross-sectional profile view of a beverage container including the cap, dome, and vessel illustrating double-walled construction.

FIG. 5 is a cross-sectional profile view illustrating a double-walled construction embodiment of the beverage container 200. The beverage container 200 is made up of three parts, a cap 205, a dome 215 and a vessel 225. As illustrated, both the vessel 225 and the dome 215 can use double-walled construction. Each has an outer wall 505, an inner wall 510, and a vacuum 507 between the two to limit the transfer of heat. It should be understood be those of skill in the art that although both the dome 215 and the vessel 225 are both shown as using double-walled construction only one, or neither, need to use double-walled construction.

While this invention has been particularly shown and described with references to example embodiments thereof, it will be understood by those skilled in the art that various changes in form and details may be made therein without departing from the scope of the invention encompassed by the appended claims. For example, the invention could be used to market a beverage to be mixed with alcohol or pre-mixed with alcohol. In such alternative embodiments, in which it is intended that alcohol and/or ice will be added to the soft-drink beverage sold in the container, the practical volumetric capacity of the vessel can exceed the soft-drink beverage sold within it by a range of 25 to 50 percent. Dimensions and proportions of the container will vary and will be influenced by the material choice, beverage volume requirements, and bottling machinery requirements at filling facilities; however, the utility of the various embodiments of the invention will be unaffected.

What is claimed is:

1. A prepackaged hermetically sealed beverage container prefilled with a ready for consumption beverage for retail sale, comprising:
   a vessel, having a sidewall, a closed end, an open end bounded by the sidewall, the open end having a threading complementary to the threading of a dome, the vessel containing the ready for consumption beverage;
   the dome, having a generally domed shape with opposed top and bottom openings having respective smaller and larger diameters, the top opening being substantially smaller than the open end of the vessel, comprising:
   threading adjacent to the bottom opening to secure the dome to the vessel, and the bottom opening further configured with a first seal arrangement between the vessel and the dome, sealed for retail sale, sealing and maintaining integrity of the ready for consumption beverage in the vessel until opened by a consumer;
   a strainer, fixed to an upper portion of the dome; and
   threading adjacent to the top opening of the dome complementary to the threading of a cap; and
   the cap, having a closed end, an open end, and threading adjacent to the open end to secure the cap to the dome, and further configured with a second seal arrangement spaced above the first seal arrangement between the cap and the dome sealing the top opening of the dome, sealed for retail sale, sealing and maintaining integrity of the beverage container until opened, the dome being sealed at the bottom and top openings by the first and second seal arrangements, the ready for consumption beverage being a beverage that is hermetically sealed within the beverage container and having a retail sale shelf life.

2. The container of claim 1, further comprising a mechanism configured to indicate tampering with the seal arrangements.

3. The container of claim 1 in which the first seal arrangement includes a first seal member sealing between the dome and the vessel, and the second seal arrangement includes a second seal member sealing between the cap and the dome.

4. The container of claim 3, in which the first and second seal arrangements include shrink wrap film.

5. The container of claim 1, wherein the beverage container further contains a non-carbonated soft-drink.

6. The container of claim 1, wherein the ready for consumption beverage includes alcohol.

7. The container of claim 1 in which the first seal arrangement includes a seal applied across the open end of the vessel, the dome having an interior chamber that is hermetically sealed by the first and second seal arrangements, and from interior regions of the vessel.

8. A prepackaged hermetically sealed beverage container prefilled with a ready for consumption beverage for retail sale, comprising:
   a vessel containing the ready for consumption beverage, having a sidewall, a closed end, and an open end bounded by the sidewall;
   the dome, having a generally domed shape with opposed top and bottom openings having respective smaller and larger diameters, the top opening being substantially smaller than the open end of the vessel, comprising:
   the bottom opening further configured with a first seal arrangement between the vessel and the dome, sealed for retail sale, for sealing and maintaining the integrity of the ready for consumption beverage in the vessel until opened by a consumer, the first seal arrangement including a seal applied across the open end of the vessel;

a strainer, fixed to an upper portion of the dome; and a cap having a closed end and an open end, and further configured with a second seal arrangement spaced above the first seal arrangement between the cap and the dome sealing the top opening of the dome, sealed for retail sale, sealing and maintaining integrity of at least an upper portion of the beverage container until opened, the dome having an interior chamber that is hermetically sealed by the first and second seal arrangements, and from interior regions of the vessel, the ready for consumption beverage being a beverage that is hermetically sealed within the beverage container and having a retail sale shelf life.

9. The container of claim 8, in which the first and second seal arrangements include shrink wrap film.

10. The container of claim 8, in which the seal across the open end of the vessel is a metal closure.

11. The container of claim 8, in which the seal across the open end of the vessel is a foil seal.

12. The container of claim 8 in which the dome is securable to the vessel, and the cap is securable to the dome, by mating threads.

13. A method of preparing, bottling, and packaging a ready for consumption beverage in a prepackaged hermetically sealed beverage container for distribution, sale, and consumption, comprising:

filling a volume of beverage into a vessel, the vessel having a sidewall, a closed end, an open end bounded by the sidewall, the open end having threading complementary to the threading of a dome;

mounting the dome to the vessel, the dome having a generally domed shape with opposed top and bottom openings having respective smaller and larger diameters, the top opening being substantially smaller than the open end of the vessel, comprising:

threading adjacent to the bottom opening, to securely screw the dome to the vessel, the bottom opening further configured with a first seal arrangement between the vessel and the dome, sealed for retail sale, sealing and maintaining the integrity of the beverage in the vessel until opened by the consumer;

a strainer, fixed to an upper portion of the dome; and threading adjacent to the top opening of the dome complementary to the threading of a cap;

securing the cap to the dome and sealing for retail sale with a second seal arrangement spaced above the first seal arrangement between the cap and the dome sealing the top opening of the dome, sealing and maintaining integrity of the beverage container until opened, the cap having a closed end, an open end, and threading adjacent to the open end, the dome being sealed at the bottom and top openings by the first and second seal arrangements, the beverage being hermetically sealed within the beverage container and having a retail sale shelf life.

14. The method of claim 13, further comprising a mechanism to indicate tampering with the seal arrangements.

15. The method of claim 13 wherein the first seal arrangement includes a first seal member sealing between the dome and the vessel, and the second seal arrangement includes a second seal member sealing between the cap and the dome.

16. The method of claim 15, in which the first and second seal arrangements include shrink wrap film.

17. The method of claim 13, wherein the beverage is a non-carbonated soft-drink.

18. The method of claim 13, wherein the ready for consumption beverage includes alcohol.

19. The method of claim 13, wherein the first seal arrangement includes a seal applied across the open end of the vessel, the dome having an interior chamber that is hermetically sealed by the first and second seal arrangements, and from interior regions of the vessel.

* * * * *